US012706705B2

(12) United States Patent
Ryu et al.

(10) Patent No.: US 12,706,705 B2
(45) Date of Patent: Aug. 11, 2026

(54) MULTIPLE PHYSICAL UPLINK SHARED CHANNEL CONFIGURATION WITH REPETITION

(71) Applicant: QUALCOMM Incorporated, San Diego, CA (US)

(72) Inventors: Jae Ho Ryu, San Diego, CA (US); Huilin Xu, Temecula, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/471,141

(22) Filed: Sep. 20, 2023

(65) Prior Publication Data

US 2025/0096954 A1 Mar. 20, 2025

(51) Int. Cl.

| | |
|---|---|
| ***H04L 1/1829*** | (2023.01) |
| ***H04L 1/1812*** | (2023.01) |
| ***H04L 1/1867*** | (2023.01) |
| ***H04W 72/0446*** | (2023.01) |
| ***H04W 72/232*** | (2023.01) |

(52) U.S. Cl.

CPC .......... *H04L 1/1861* (2013.01); *H04L 1/1819* (2013.01); *H04L 1/1893* (2013.01); *H04W 72/0446* (2013.01); *H04W 72/232* (2023.01)

(58) Field of Classification Search

CPC ... H04L 1/1861; H04L 1/1819; H04L 1/1893; H04L 1/1887; H04L 1/189; H04L 1/1896; H04L 1/1822; H04W 72/0446; H04W 72/232

USPC .......................................................... 370/329

See application file for complete search history.

(56) References Cited

U.S. PATENT DOCUMENTS

2021/0360660 A1* 11/2021 Cozzo ................ H04W 72/535
2022/0272739 A1* 8/2022 Takahashi ......... H04W 72/1268

OTHER PUBLICATIONS

Moderator, "Moderator Final Summary—XR Specific Capacity Improvements", R1-2308613, Aug. 21-25, 2023 (From Applicant's IDS) (Year: 2023).*

(Continued)

*Primary Examiner* — Mang Hang Yeung
(74) *Attorney, Agent, or Firm* — QUALCOMM Incorporated

(57) ABSTRACT

Various aspects of the present disclosure generally relate to wireless communication. In some aspects, a user equipment (UE) may receive a multiple physical uplink shared channel (multi-PUSCH) configuration, assign a first hybrid automatic repeat request (HARQ) process identifier (HPID) and one or more redundant version identifiers (RVIDs) to two or more slots associated with a first transport block, and assign a second HPID and the one or more RVIDs to two or more slots associated with a second transport block. The first transport block and the second transport block may be part of a single configured grant period. Assigning the second HPID may include incrementing the first HPID using one or more of a physical slot count, an available slot count, or a repetition number. The UE may transmit a multi-PUSCH communication in accordance with the multi-PUSCH configuration. Numerous other aspects are described.

30 Claims, 11 Drawing Sheets

(56) References Cited

OTHER PUBLICATIONS

Falahati S (Ericsson)., et al., "Capacity Enhancements for XR", 3GPP TSG-RAN WG1 Meeting #114, R1-2306607, Type Discussion, NR_XR_ENH-CORE, 3rd Generation Partnership Project, Mobile Competence Centre, 650, Route Des Lucioles, F-06921 Sophia-Antipolis Cedex, France, vol. RAN WG1, No., Toulouse, FR, Aug. 21, 2023-Aug. 25, 2023, Aug. 11, 2023, XP052435838, 34 pages, paragraph [2.1.2].
International Search Report and Written Opinion—PCT/US2024/045938—ISA/EPO—Dec. 2, 2024.
Merias P (Moderator (Ericsson))., et al., "Moderator Final Summary-XR Specific Capacity Improvements", 3GPP TSG-RAN WG1 Meeting #114, R1-2308613, Type Discussion, NR_XR_ENH-CORE, 3rd Generation Partnership Project, Mobile Competence Centre, 650, Route Des Lucioles, F-06921 Sophia-Antipolis Cedex, France, vol. RAN WG1, No., Toulouse, FR, Aug. 21, 20230-Aug. 25, 2023, Aug. 31, 2023, XP052500612, 87 pages, paragraph [02.1].
Rao J (Interdigital Inc)., et al., "Discussion on XR-Specific Capacity Enhancements", 3GPP TSG RAN WG1 #114, R1-2307820, Type Discussion, NR_XR_ENH-CORE, 3rd Generation Partnership Project, Mobile Competence Centre, 650, Route Des Lucioles, F-06921 Sophia-Antipolis Cedex, France, vol. RAN WG1, No., Toulouse, FR, Aug. 21, 2023-Aug. 25, 2023, Aug. 11, 2023, XP052437040, 7 pages, paragraph [02.1].

* cited by examiner

MULTIPLE PHYSICAL UPLINK SHARED CHANNEL CONFIGURATION WITH REPETITION

FIELD OF THE DISCLOSURE

Aspects of the present disclosure generally relate to wireless communication and to techniques and apparatuses for multiple physical uplink shared channel communications with repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a multiple physical uplink shared channel (multi-PUSCH) configuration; assigning a first hybrid automatic repeat request (HARQ) process identifier (HPID) and one or more redundant version identifiers (RVIDs) to two or more slots associated with a first transport block in accordance with the multi-PUSCH configuration; assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmitting a multi-PUSCH communication in accordance with the multi-PUSCH configuration.

In some aspects, a method of wireless communication performed by a network node includes transmitting a multi-PUSCH configuration for: assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receiving a multi-PUSCH communication transmitted in accordance with the multi-PUSCH configuration.

In some aspects, a UE for wireless communication includes one or more memories; and one or more processors, coupled to the one or more memories, configured to cause the UE to: receive a multi-PUSCH configuration; assign a first HPID and one or more RVIDs to two or more slots associated with a first transport block in accordance with the multi-PUSCH configuration; assign a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmit a multi-PUSCH communication in accordance with the multi-PUSCH configuration.

In some aspects, a network node for wireless communication includes one or more memories; and one or more processors, coupled to the one or more memories, configured to cause the network node to: transmit a multi-PUSCH configuration for: assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receive a multi-PUSCH communication in accordance with the multi-PUSCH configuration.

In some aspects, a non-transitory computer-readable medium storing a set of instructions for wireless communication includes one or more instructions that, when executed by one or more processors of a UE, cause the UE to: receive a multi-PUSCH configuration; assign a first HPID and one or more RVIDs to two or more slots associated with a first transport block in accordance with the multi-PUSCH configuration; assign a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmit a multi-PUSCH communication in accordance with the multi-PUSCH configuration.

In some aspects, a non-transitory computer-readable medium storing a set of instructions for wireless communication includes one or more instructions that, when executed by one or more processors of a network node, cause the network node to: transmit a multi-PUSCH configuration for: assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receive a multi-PUSCH communication transmitted in accordance with the multi-PUSCH configuration.

In some aspects, an apparatus for wireless communication includes means for receiving a multi-PUSCH configuration; means for assigning a first HPID and one or more RVIDs to two or more slots associated with a first transport block in accordance with the multi-PUSCH configuration; means for assigning a second HPID and the one or more RVIDs to two or more slots associated with a second transport block in accordance with the multi-PUSCH configuration, the first transport block and the second transport block being part of a single configured grant period, and wherein the means for assigning the second HPID includes means for incrementing the first HPID using one or more of a physical slot count, an available slot count, or a repetition number; and means for transmitting a multi-PUSCH communication in accordance with the multi-PUSCH configuration.

In some aspects, an apparatus for wireless communication includes means for transmitting a multi-PUSCH configuration for: assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein the means for assigning the second HPID includes means for incrementing the first HPID using one or more of a physical slot count, an available slot count, or a repetition number; and means for receiving a multi-PUSCH communication transmitted in accordance with the multi-PUSCH configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
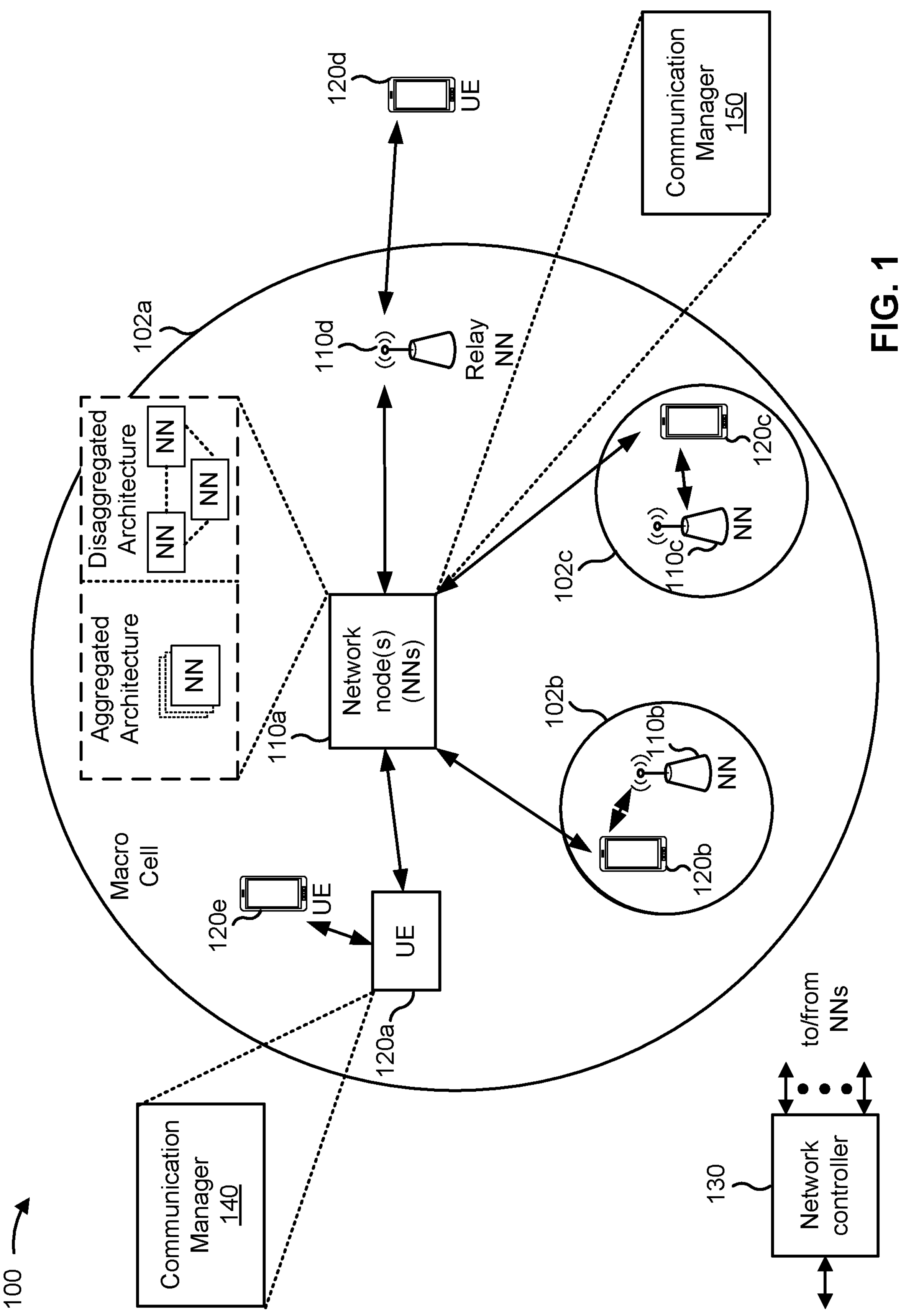
FIG. 1 is a diagram illustrating an example of a wireless network, in accordance with the present disclosure.

Wireless communication systems seek to ensure the reliability of data transmission in scenarios such as at the cell edge or under severe fading conditions. The physical uplink shared channel (PUSCH) with repetition can bolster the reliability of uplink transmissions. PUSCH communications with repetition involve transmitting the same data multiple times over distinct time or frequency domain resources to improve the likelihood that the data will be received. Multi-PUSCH is a technique that allows a user equipment (UE) to simultaneously transmit multiple PUSCH occasions within a single configured grant period, which can improve efficiency and throughput. Presently, however, wireless communication standards do not support multi-PUSCH communications with repetition.

Various aspects relate generally to configurations for multi-PUSCH communications with repetition. Some aspects more specifically relate to configurations for assigning a hybrid automatic repeat request (HARQ) process identifier (HPID) and redundant version identifier (RVID) to slots of a transport block to provide multi-PUSCH communications with repetition. In some examples, a UE receives a multi-PUSCH configuration for assigning a first HPID and one or more RVIDs to two or more slots in a first transport block, and for assigning a second HPID and the one or more RVIDs to two or more slots in a second transport block, the first transport block and the second transport block being part of a single configured grant period and the second HPID being incremented relative to the first HPID using one or more of a physical slot count, an available slot count, or a repetition number; and transmits a multi-PUSCH communication in accordance with the multi-PUSCH configuration. In some examples, a network node transmits a multi-PUSCH configuration for assigning one or more of a first HPID and one or more RVIDs to two or more slots in a first transport block, and for assigning a second HPID and the one or more RVIDs to two or more slots in a second transport block, the first transport block and the second transport block being part of a single configured grant period and the second HPID being incremented relative to the first HPID using one or more of a physical slot count, an available slot count, or a repetition number; and receives a multi-PUSCH communication in accordance with the multi-PUSCH configuration.

Particular aspects of the subject matter described in this disclosure can be implemented to realize one or more of the following potential advantages. In some examples, by transmitting a multi-PUSCH communication in accordance with the multi-PUSCH configuration, the UE can facilitate multi-PUSCH communications with repetition. In some examples, by transmitting a multi-PUSCH configuration, the network node can improve network performance by increasing the likelihood of successful multi-PUSCH communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may assign a first HPID and one or more RVIDs to two or more slots associated with a first transport block in accordance with the multi-PUSCH configuration and assign a second HPID and the one or more RVIDs to two or more slots associated with a second transport block in accordance with the multi-PUSCH configuration. The first transport block and the second transport block may be part of a single configured grant period. Assigning the second HPID may include incrementing the first HPID using one or more of a physical slot count, an available slot count, or a repetition number. The communication manager 140 may transmit a multi-PUSCH communication in accordance with the multi-PUSCH configuration. Additionally, or alternatively, the communication manager 140 may perform one or more other operations described herein.

In some aspects, the network node 110 may include a communication manager 150. As described in more detail elsewhere herein, the communication manager 150 may transmit a multi-PUSCH configuration for assigning a first HPID and one or more RVIDs to two or more slots associated with a first transport block in accordance with the multi-PUSCH configuration, and for assigning a second HPID and the one or more RVIDs to two or more slots associated with a second transport block. The first transport block and the second transport block may be part of a single configured grant period. Assigning the second HPID may include incrementing the first HPID using one or more of a physical slot count, an available slot count, or a repetition number. The communication manager 150 may receive a multi-PUSCH communication transmitted in accordance with the multi-PUSCH configuration. Additionally, or alternatively, the communication manager 150 may perform one or more other operations described herein.

As indicated above, FIG. 1 is provided as an example. Other examples may differ from what is described with regard to FIG. 1.

Figure 2:
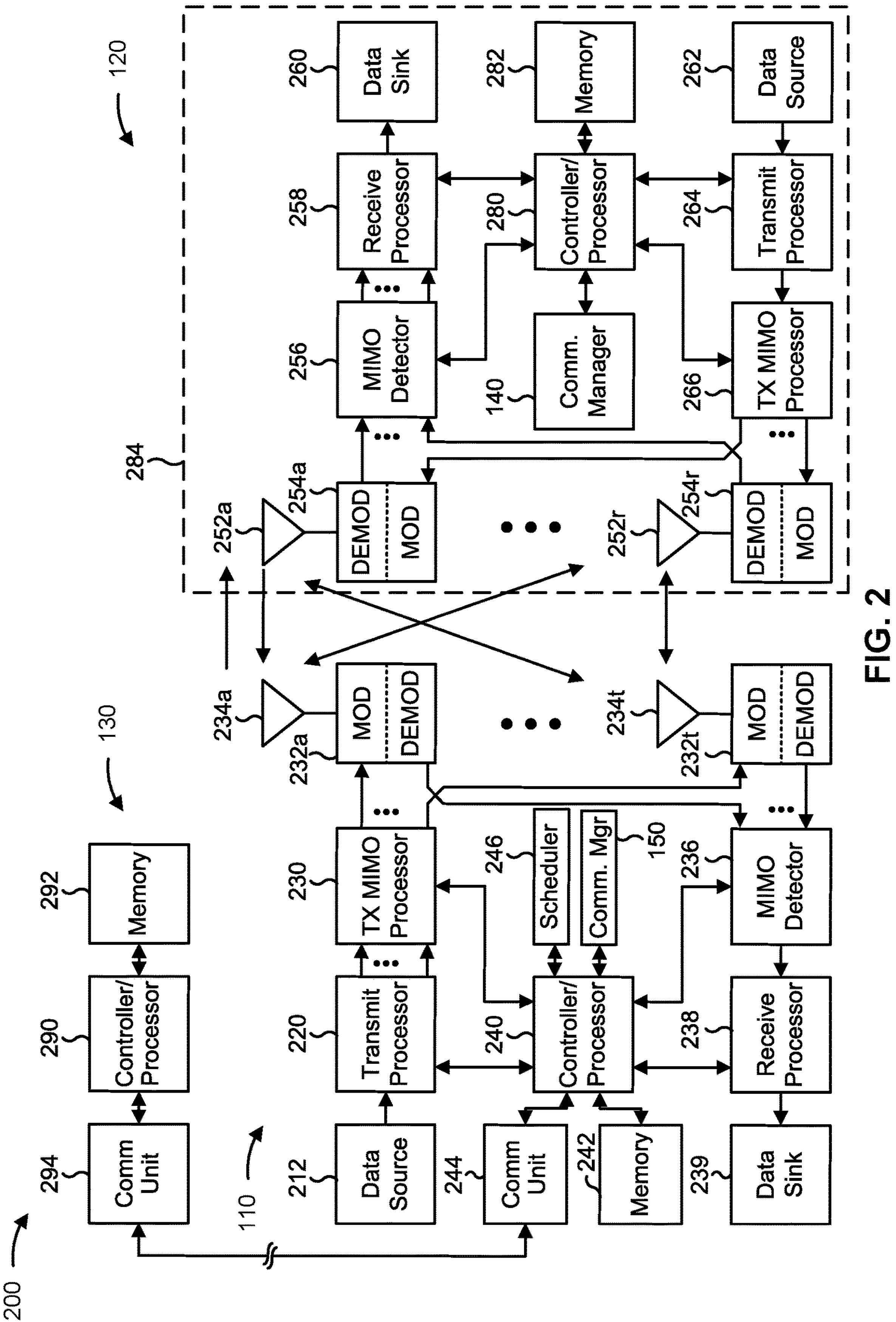
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with multi-PUSCH communications with repetition, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a multi-PUSCH configuration; means for assigning a first HPID and one or more RVIDs to two or more slots associated with a first transport block in accordance with the multi-PUSCH configuration; means for assigning a second HPID and the one or more RVIDs to two or more slots associated with a second transport block in accordance with the multi-PUSCH configuration; and/or means for transmitting a multi-PUSCH communication in accordance with the multi-PUSCH configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a multi-PUSCH configuration for: assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration; and/or means for receiving a multi-PUSCH communication transmitted in accordance with the multi-PUSCH configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
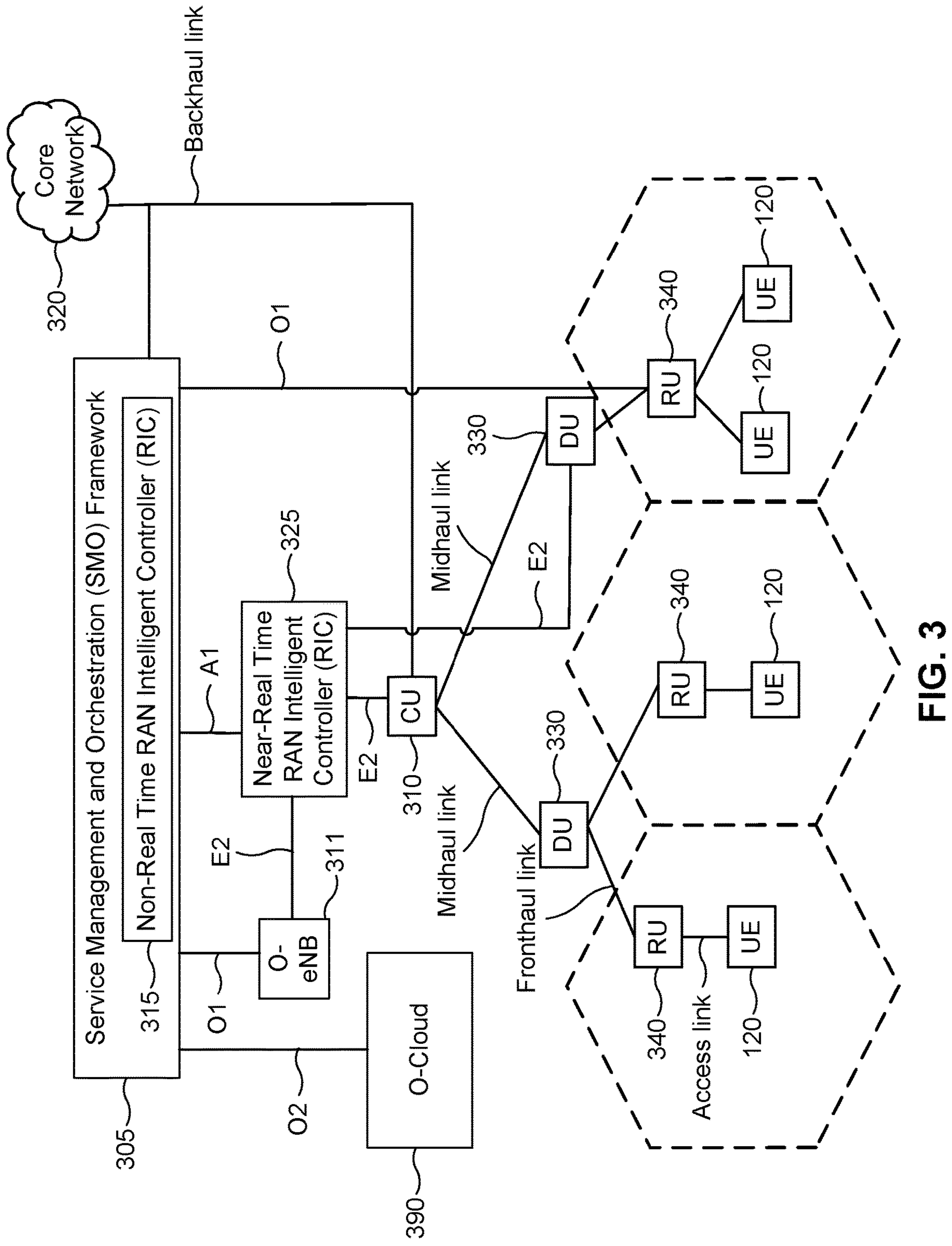
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
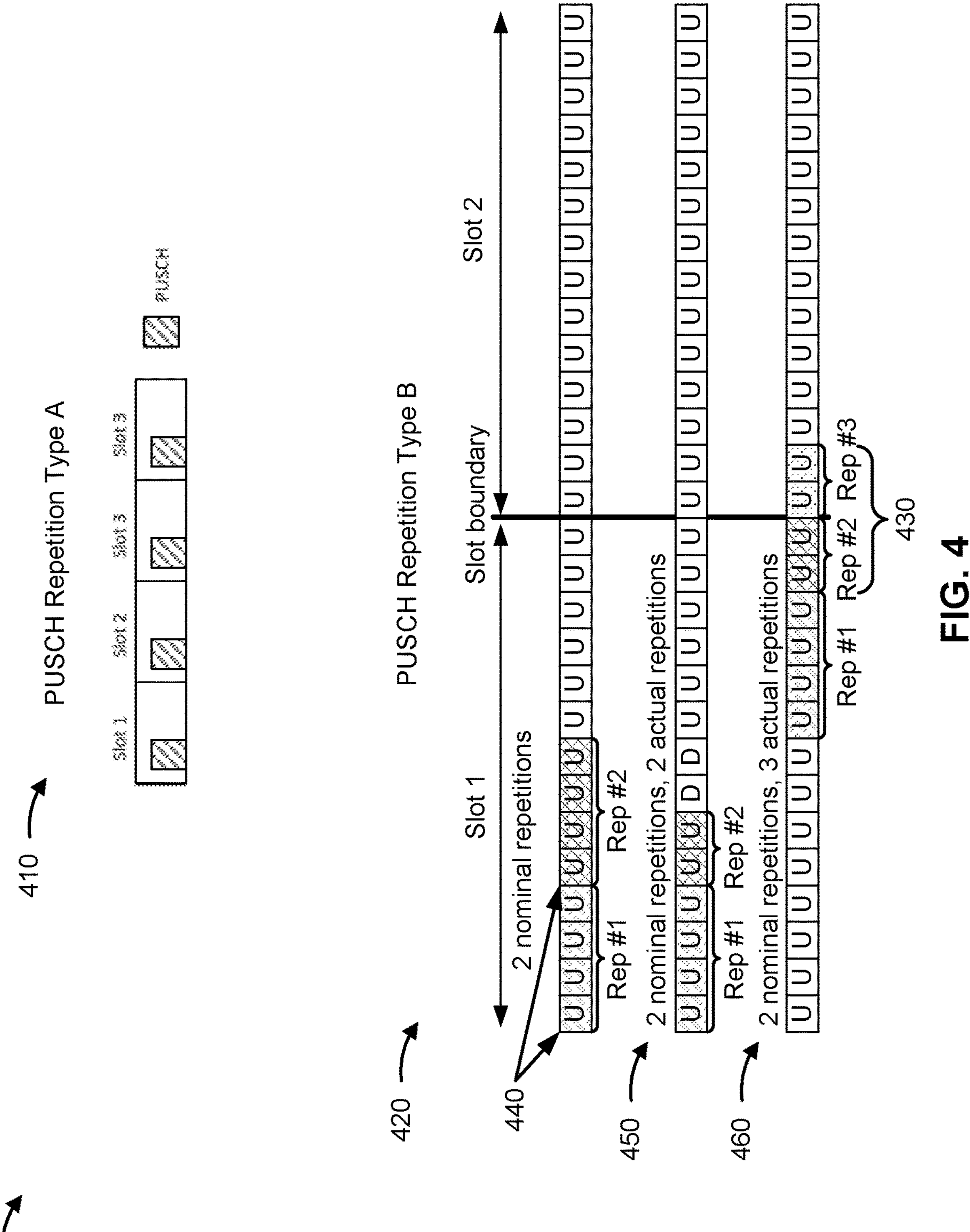
FIG. 4 is a diagram illustrating an example of physical uplink shared channel (PUSCH) Repetition Type A and PUSCH Repetition Type B, in accordance with the present disclosure.

FIG. 4 is a diagram illustrating an example 400 of PUSCH Repetition Type A and PUSCH Repetition Type B, in accordance with the present disclosure. Although techniques are described herein in connection with PUSCH repetitions, these techniques can be applied to various types of uplink repetitions, such as an uplink data repetition, an uplink control repetition (e.g., a physical uplink control channel (PUCCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., an acknowledgement (ACK) or negative acknowledgement (NACK)) indicating whether the initial transmission was successfully received. In some aspects, ACK or NACK feedback may be disabled for repetitions, thereby reducing signaling overhead that would otherwise be used for ACK or NACK feedback.

In some aspects, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication and is also used to refer to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 410, for a first uplink repetition type referred to as PUSCH Repetition Type A, uplink transmission occasions are not permitted to cross a slot boundary, and only one uplink transmission occasion is permitted per slot. Thus, if a UE 120 is configured with PUSCH Repetition Type A, then the UE 120 cannot transmit a repetition in a set of symbols that occurs in more than one slot, and can only transmit the repetition if all symbols of the repetition occur in the same slot. Furthermore, if a UE 120 is configured with PUSCH Repetition Type A, then the UE 120 cannot transmit more than one repetition per slot. Thus, for PUSCH Repetition Type A, a transmission occasion corresponds to a slot. Furthermore, for PUSCH Repetition Type A, the time domain allocation for a repetition within a slot may be the same across all slots for which repetitions are scheduled. In other words, each repetition, associated with the same initial transmission, may start in the same starting symbol (e.g., having the same starting symbol index) in each slot in which a repetition is scheduled and may occupy the same number of symbols.

As shown by reference number 420, for a second uplink repetition type referred to as PUSCH Repetition Type B, uplink transmission occasions are permitted to cross a slot boundary (as shown by reference number 430, where a single nominal repetition crosses a slot boundary and is divided into two actual repetitions), and more than one uplink transmission occasion is permitted per slot (as shown by reference number 440). Thus, if a UE 120 is configured with PUSCH Repetition Type B, then the UE 120 can transmit a repetition (e.g., a nominal repetition) in a set of symbols that occurs in more than one slot, and the UE 120 can transmit the repetition even if all symbols of the repetition do not occur in the same slot. Furthermore, if a UE 120 is configured with PUSCH Repetition Type B, then the UE 120 can transmit more than one repetition per slot. Thus, for PUSCH Repetition Type B, a transmission occasion corresponds to a portion of a slot, such as a mini-slot. Furthermore, for PUSCH Repetition Type B, the time domain allocation for a repetition within a slot may be different for different repetitions. In other words, different repetitions, associated with the same initial transmission, may start in different starting symbols (e.g., having different starting symbol indexes).

In PUSCH Repetition Type B, the term "nominal repetition" refers to a potential PUSCH repetition as indicated by a network node 110. A nominal repetition signaled or scheduled by the network node 110 may be truncated or divided into one or two "actual repetitions." A nominal repetition consists of a set of consecutive symbols over which the UE 120 is expected to transmit a PUSCH repetition. However, when this set of consecutive symbols crosses a slot boundary, contains semi-static downlink symbols, or encounters (e.g., is scheduled to occur within) an invalid symbol pattern, among other examples, then the UE 120 is required to split the nominal repetition into one or two parts. Each of these parts is then referred to as an "actual repetition."

For example, as shown by reference number 450, a PUSCH transmission may include four symbols, and a network node 110 may configure a UE 120 (e.g., in an RRC message) to transmit two nominal repetitions of the PUSCH transmission. The two nominal repetitions may span a total of eight symbols and may each include four symbols. The two nominal repetitions are scheduled in the first eight symbols of a slot (shown as Slot 1). For example, the first nominal repetition may be scheduled in the first four symbols of a slot (the first, second, third, and fourth symbols), and the second nominal repetition may be scheduled in the next four symbols of the slot (the fifth, sixth, seventh, and eighth symbols). The first nominal repetition is actually transmitted in the first four symbols and is thus treated as a single actual repetition (shown as "Rep #1"). For the second nominal repetition, the UE 120 actually transmits the first two symbols but cannot transmit the last two symbols because the last two symbols are downlink symbols. Thus, the UE 120 drops the last two symbols, and the resulting actual repetition (shown as "Rep #2") includes only the first two symbols.

As another example, as shown by reference number 460, a PUSCH transmission may include four symbols, and a network node 110 may configure a UE 120 to transmit two nominal repetitions of the PUSCH transmission. The two nominal repetitions may each include four symbols, shown as the ninth, tenth, eleventh, and twelfth symbols of a first slot (Slot 1) for a first nominal repetition, and shown as the thirteenth and fourteenth symbols of the first slot plus the first and second symbols of a second slot (Slot 2) for a second nominal repetition. The first nominal repetition is transmitted in four consecutive symbols and is thus treated as a single actual repetition (shown as "Rep #1"). The second nominal repetition is transmitted in consecutive symbols that cross a slot boundary (e.g., that occur in more than one slot) and is thus divided into two actual repetitions, with a first actual repetition (shown as "Rep #2") being transmitted in a first set of consecutive symbols in the first slot (the thirteenth and fourteenth symbols of Slot 1) and a second actual repetition (shown as "Rep #3) being transmitted in a second set of consecutive symbols in the second slot (the first and second symbols of Slot 2).

As discussed in greater detail below with respect to FIGS. 5 and 6, repetitions can also be applied to multi-PUSCH communications. For example, multiple uplink transmission occasions within a transport block may be used to transmit PUSCH repetitions.

As indicated above, FIG. 4 is provided as an example. Other examples may differ from what is described with respect to FIG. 4.

Figure 5:
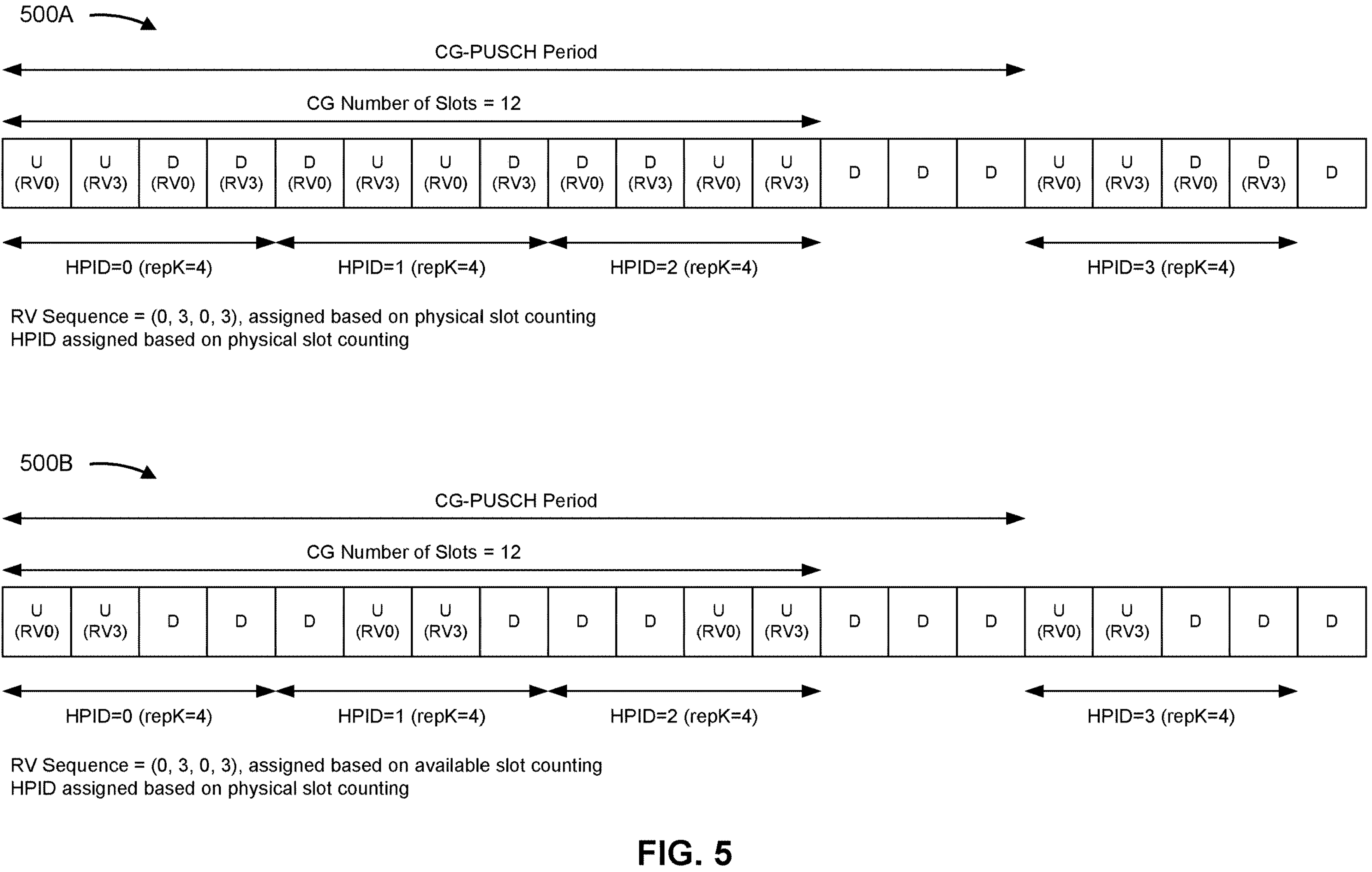
FIG. 5 is a diagram illustrating examples associated with multi-PUSCH repetition identifiers based on physical slot counting or both physical slot counting and available slot counting, in accordance with the present disclosure.

FIG. 5 is a diagram illustrating examples 500A and 500B associated with multi-PUSCH repetition identifiers based on physical slot counting or both physical slot counting and available slot counting, in accordance with the present disclosure. As shown in FIG. 5, examples 500A and 500B represent uplink and downlink communications between a network node 110 and a UE 120. In some aspects, the network node 110 and the UE 120 may be included in a wireless network, such as wireless network 100.

As shown in examples 500A and 500B, the uplink and downlink communications may occur as part of a configured grant (CG) configuring multiple uplink and downlink slots for multi-PUSCH communications between the UE 120 and the network node 110. A CG-PUSCH period may include multiple groups of uplink and downlink slots. In the examples 500A and 500B, the CG-PUSCH period includes six uplink slots and 15 total slots (uplink and downlink slots).

The configuration for the multi-PUSCH communication may include a parameter (e.g., nrofSlotsMultiPUSCH-CG) for a number of total slots available for multi-PUSCH communications in a configured grant period. In the examples 500A and 500B, the total number of uplink and downlink slots for multi-PUSCH communication may be 12.

Another parameter (e.g., repK) may indicate the number of repetitions to be used in the multi-PUSCH communications. The number of repetitions may be configured by the parameter repK in the configuration ConfiguredGrantConfig for Type 1 CG-PUSCH and/or for Type 2 CG-PUSCH. Alternatively, for Type 2 CG-PUSCH, the number of repetitions may be indicated by the numberOfRepetitions parameter in a time domain resource allocation (TDRA) table and/or determined by a TDRA field in downlink control information (DCI).

In some aspects, the same start and length indicator value (SLIV) may be applied to all slots configured for multi-PUSCH CG transmissions. The SLIV may indicate the start position and length of each resource allocation. In some aspects, one or more PUSCH transmissions may be dropped for slots where the PUSCH SLIV overlaps downlink symbols configured by RRC messaging.

An HPID may be assigned to each transport block. The HPID may be fixed within physical slots for the repetitions for the same transport block and incremented across different transport blocks. The number of HPIDs assigned to each configured grant period may be defined as the ceiling of the parameter nrofSlotsMultiPUSCH-CG divided by the number of repetitions (repK). In the examples 500A and 500B, the ceiling of the parameter nrofSlotsMultiPUSCH-CG (12) divided by the number of repetitions (repK) (4) is three (e.g., 12/4=3). Therefore, three HPIDs may be assigned to the CG-PUSCH period. As shown, each HPID is associated with a transport block of four slots, two of which are uplink slots and two of which are downlink slots. The HPID may increment for subsequent transport blocks. For instance, a first transport block may be assigned a first HPID (e.g., HPID=0), a second transport block may be assigned a second HPID (e.g., HPID=1), a third transport block may be assigned a third HPID (e.g., HPID=2), and a fourth transport block may be assigned a fourth HPID (e.g., HPID=4). In some aspects, the HPID may not be incremented if, for example, all repetitions are dropped due to a collision with a semi-static downlink symbol or a synchronization signal block (SSB).

An RVID may be assigned to two or more slots in each transport block. In instances where the HPID is assigned based on the physical slot count, the RVIDs may be applied based, at least in part, on the physical slot count or an available slot count and in accordance with a redundant version (RV) sequence. For example, the RV sequence shown in the examples 500A and 500B may be (0, 3, 0, 3). In the example 500A, the RVIDs are applied based, at least in part, on the physical slot count in accordance with the RV sequence. Applying the RVIDs based, at least in part, on the physical slot count may mean that every slot, including downlink slots, in the transport block is assigned an RVID following the RV sequence. Following this approach, as shown in the example 500A, the RVIDs for the uplink slots in the first transport block (HPID=0) are RV0 and RV3, the RVIDs for the uplink slots in the second transport block (HPID=1) are RV3 and RV0, and the RVIDs for the uplink slots in the third transport block (HPID=2) are RV0 and RV3.

Alternatively, the RVIDs may be applied based, at least in part, on the available slot count rather than the physical slot count. Applying the RVIDs based, at least in part, on the available slot count may include applying the RVIDs, in order of the RVID sequence, to only the uplink slots. Following this approach, as shown in the example 500B, the RVIDs for the two uplink slots in the first transport block (HPID=0), the second transport block (HPID=1), and the third transport block (HPID=2) are RV0 and RV3, respectively.

As indicated above, FIG. 5 is provided as an example. Other examples may differ from what is described with respect to FIG. 5.

Figure 6:
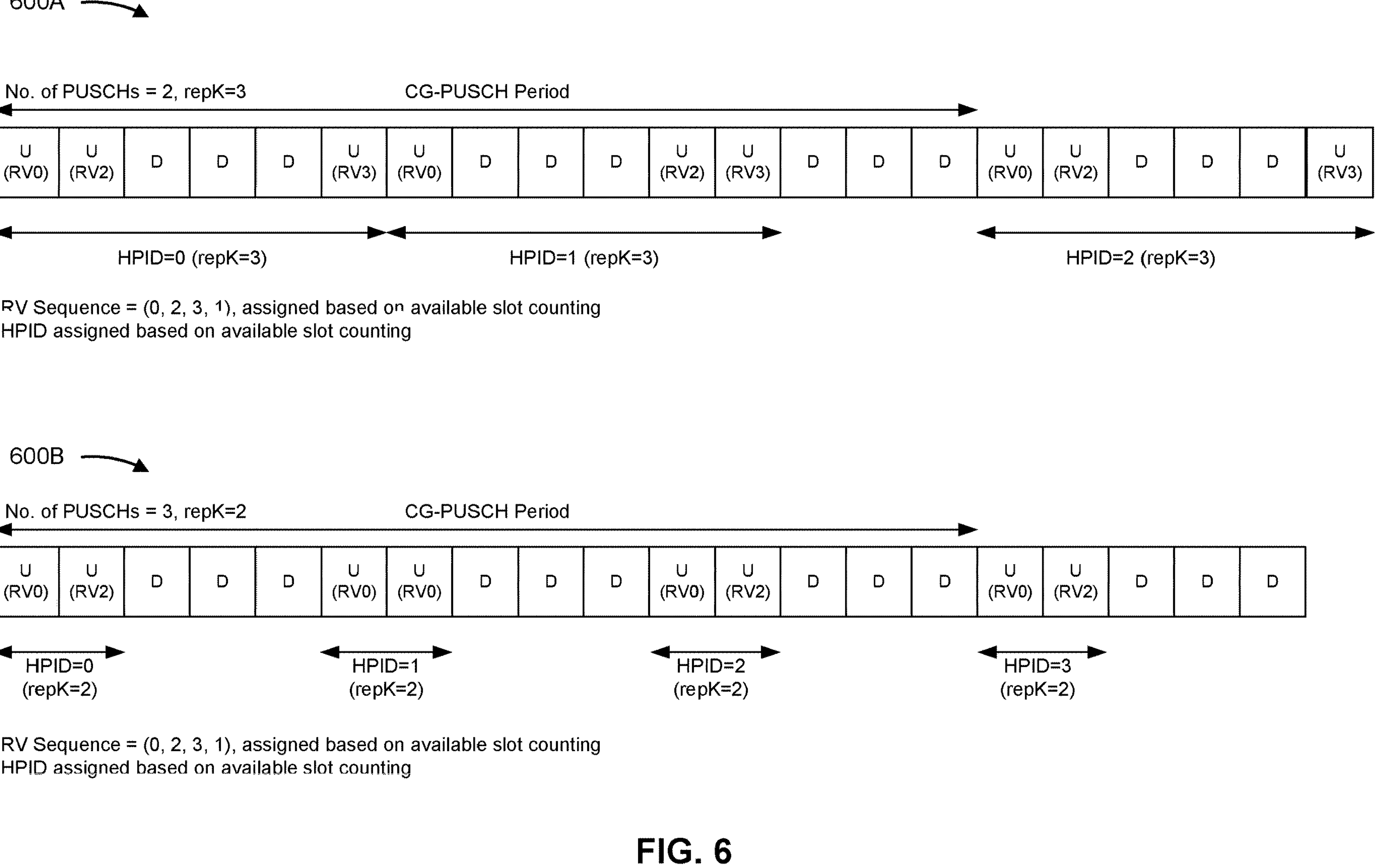
FIG. 6 is a diagram illustrating examples associated with multi-PUSCH repetition identifiers based on available slot counting, in accordance with the present disclosure.

FIG. 6 is a diagram illustrating examples 600A and 600B associated with multi-PUSCH repetition identifiers based on available slot counting, in accordance with the present disclosure. As shown in FIG. 6, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in examples 600A and 600B, the uplink and downlink communications may occur as part of a CG configuring multiple uplink and downlink slots for multi-PUSCH communications between the UE 120 and the network node 110. A CG-PUSCH period may include multiple groups of uplink and downlink slots. In the examples 600A and 600B, the CG-PUSCH period includes six uplink slots and 15 total slots (uplink and downlink slots).

The configuration for the multi-PUSCH communication may include a parameter (e.g., nrofPUSCHs) for a number of multi-PUSCH transport blocks within each CG-PUSCH configuration. In the example 600A, the number of multi-PUSCH transport blocks is two, each having three uplink slots. In the example 600B, the number of multi-PUSCH transport blocks is three, each having two uplink slots.

Another parameter (e.g., repK) may indicate the number of repetitions to be used in the multi-PUSCH communications. The number of repetitions may be configured by the parameter repK in the configuration ConfiguredGrantConfig for Type 1 CG-PUSCH and/or for Type 2 CG-PUSCH. Alternatively, for Type 2 CG-PUSCH, the number of repetitions may be indicated by the numberOfRepetitions parameter in a TDRA table and/or determined by a TDRA field in DCI.

In some aspects, the same SLIV may be applied to all slots configured for multi-PUSCH CG transmissions. The SLIV may indicate the start position and length of each resource allocation. In some aspects, one or more PUSCH transmissions may be dropped for slots where the PUSCH SLIV overlaps downlink symbols configured by RRC messaging.

An HPID may be assigned to each transport block. The HPID may be fixed within physical slots for the repetitions for the same transport block and incremented across different transport blocks. The number of HPIDs assigned to each configured grant may be defined as the number of multi-PUSCH transport blocks (e.g., the parameter nrofPUSCHs), discussed above. In the example 600A, the parameter nrofPUSCHs is two. Therefore, in the example 600A, the number of HPIDs assigned to each configured grant period may be two. In the example 600B, the parameter nrofPUSCHs is three. Therefore, in the example 600B, the number of HPIDs assigned to each configured grant period may be three. As shown, each HPID is associated with a transport block repeated over three uplink slots (in example 600A), or a transport block repeated over two uplink slots (in example 600B). The HPID may increment for subsequent transport blocks. For instance, in both examples 600A and 600B, a first transport block may be assigned a first HPID (e.g., HPID=0), a second transport block may be assigned a second HPID (e.g., HPID=1), and a third transport block may be assigned a third HPID (e.g., HPID=2). The example 600B further illustrates a fourth transport block, which may be assigned a fourth HPID (e.g., HPID=4).

An RVID may be assigned to the uplink slots in each transport block. In the examples 600A and 600B, the HPIDs and RVIDs are assigned based on the available slot count. While the HPIDs may be incremented sequentially, as discussed above, the RVIDs may be assigned in accordance with an RV sequence. For example, the RV sequence shown in the examples 600A and 600B may be (0, 2, 3, 1). In the example 600A, only RVIDs 0, 2, and 3 (RV0, RV2, and RV3, respectively) are assigned because only three uplink slots are available in each transport block. In the example 600B, only RVIDs 0 and 2 (RV0 and RV2, respectively) are assigned because only two uplink slots are available in each transport block.

As indicated above, FIG. 6 is provided as an example. Other examples may differ from what is described with respect to FIG. 6.

Figure 7:
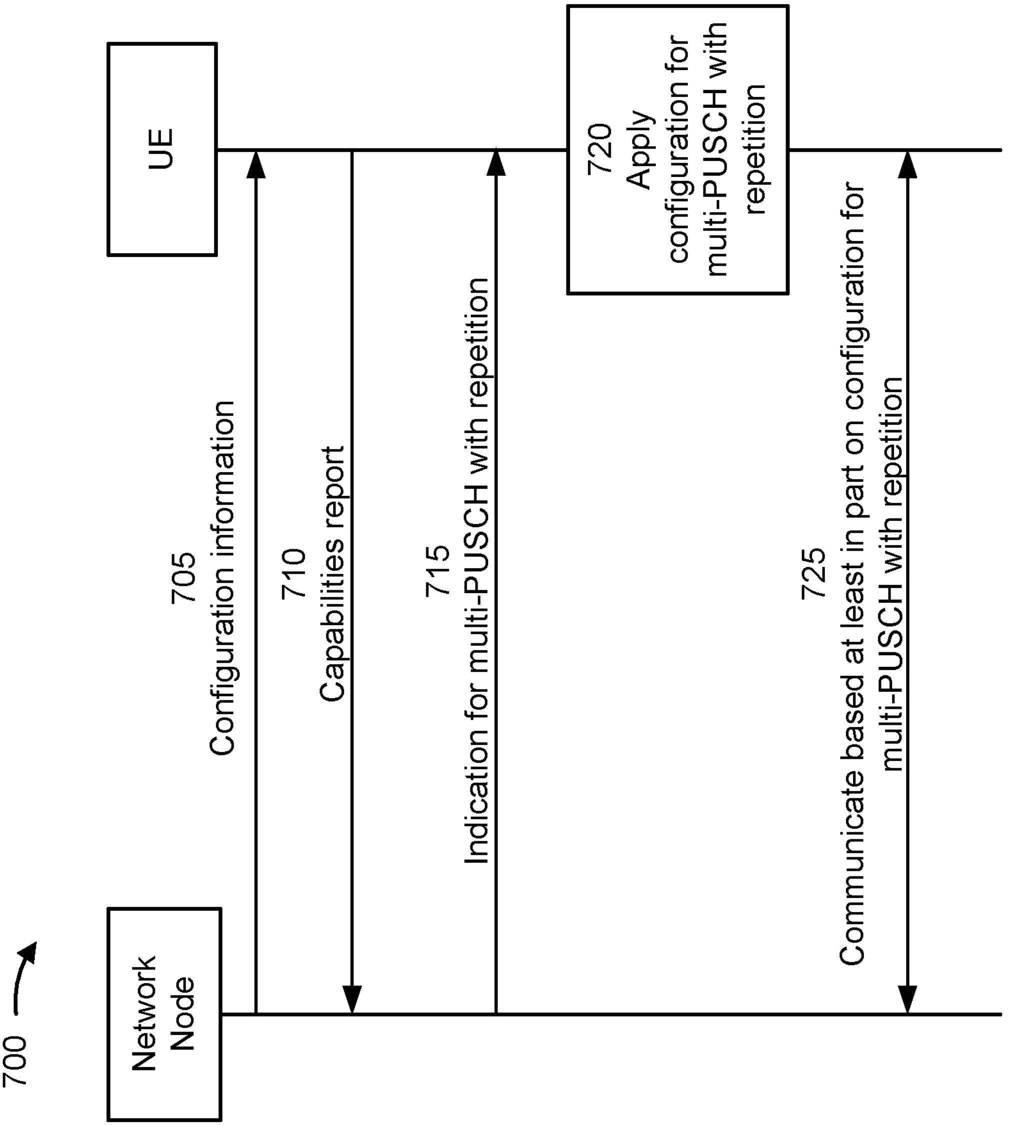
FIG. 7 is a diagram of an example associated with multi-PUSCH communications with repetition, in accordance with the present disclosure.

FIG. 7 is a diagram of an example 700 associated with multi-PUSCH communications with repetition, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown by reference number 705, the network node may transmit, and the UE may receive, configuration information. In some aspects, the UE may receive the configuration information via one or more of system information (e.g., a master information block (MIB) and/or a system information block (SIB), among other examples), RRC signaling, one or more medium access control (MAC) control elements (CEs), and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC CEs and/or one or more DCI messages, among other examples.

In some aspects, the configuration information may indicate that the UE is to transmit multi-PUSCH communications with repetition. The UE may configure itself based at least in part on the configuration information. In some aspects, the UE may be configured to perform one or more operations described herein based at least in part on the configuration information.

As shown by reference number 710, the UE may transmit, and the network node may receive, a capabilities report. The capabilities report may indicate whether the UE supports a feature and/or one or more parameters related to the feature. For example, the capability information may indicate a capability and/or parameter for multi-PUSCH communications with repetition. One or more operations described herein may be based on capability information of the capabilities report. For example, the UE may perform a communication in accordance with the capability information, or may receive configuration information that is in accordance with the capability information. In some aspects, the capabilities report may indicate UE support for multi-PUSCH communications with repetition with the HPID and/or RVID assigned based, at least in part, on the physical slot count, the available slot count, and/or a combination thereof, among other examples.

In some aspects, the configuration information described in connection with reference number 705 and/or the capabilities report may include information transmitted via multiple communications. Additionally, or alternatively, the network node may transmit the configuration information, or a communication including at least a portion of the configuration information, before and/or after the UE transmits the capabilities report. For example, the network node may transmit a first portion of the configuration information before the capabilities report, the UE may transmit at least a portion of the capabilities report, and the network node may transmit a second portion of the configuration information after receiving the capabilities report.

As shown by reference number 715, the UE may receive, and the network node may transmit, an indication for multi-PUSCH communications with repetition. The indication may cause the UE to apply the configuration including one or more of the parameters discussed above with respect to, for example, examples 500A and/or 500B of FIG. 5, examples 600A and/or 600B of FIG. 6, and/or a combination thereof, among other examples.

As shown by reference number 720, the UE may configure itself, based at least in part on receiving the configuration described in connection with reference number 715, to transmit multi-PUSCH communications. For example, the UE may assign the HPIDs and/or the RVIDs based, at least in part, on the physical slot count, the available slot count, and/or a combination thereof, among other examples, as discussed above with respect to FIGS. 5 and 6.

As shown by reference number 725, the UE may communicate with the network node based at least in part on the configuration described in connection with reference number 715 to transmit multi-PUSCH communications with repetition, thereby realizing gains in efficiency and throughput from uplink transmissions with repetition, which were previous unavailable for multi-PUSCH communications.

As indicated above, FIG. 7 is provided as an example. Other examples may differ from what is described with respect to FIG. 7.

Figure 8:
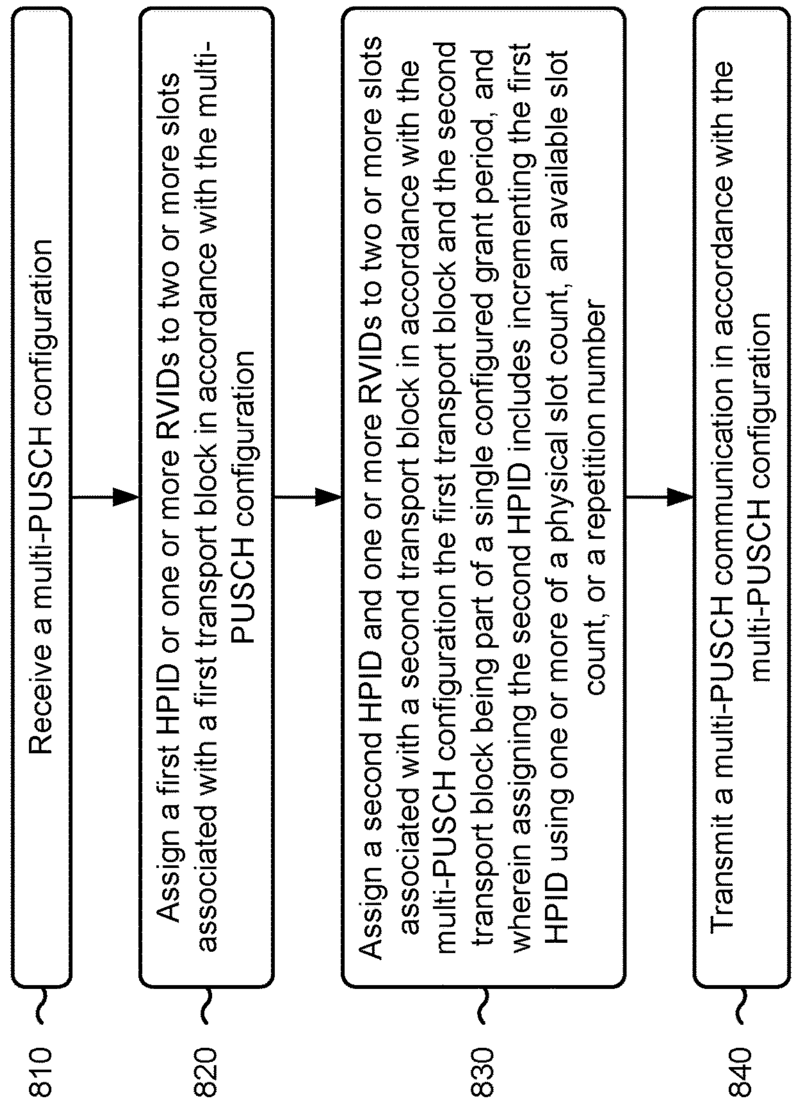
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with a multi-PUSCH configuration with repetition.

As shown in FIG. 8, in some aspects, process 800 may include receiving a multi-PUSCH configuration (block 810). For example, the UE (e.g., using reception component 1002 and/or communication manager 1006, depicted in FIG. 10) may receive a multi-PUSCH configuration, as described above.

As further shown in FIG. 8, in some aspects, process 800 may include assigning a first HPID and one or more RVIDs to two or more slots associated with a first transport block in accordance with the multi-PUSCH configuration (block 820). For example, the UE (e.g., using communication manager 1006, depicted in FIG. 10) may assign a first HPID or one or more RVIDs to two or more slots associated with a first transport block in accordance with the multi-PUSCH configuration, as described above.

As further shown in FIG. 8, in some aspects, process 800 may include assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number (block 830). For example, the UE (e.g., using communication manager 1006, depicted in FIG. 10) may assign a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number, as described above. In some aspects, assigning the second HPID includes incrementing the first HPID using one or more of a physical slot count, an available slot count, or a repetition number.

As further shown in FIG. 8, in some aspects, process 800 may include transmitting a multi-PUSCH communication in accordance with the multi-PUSCH configuration (block 840). For example, the UE (e.g., using transmission component 1004 and/or communication manager 1006, depicted in FIG. 10) may transmit a multi-PUSCH communication in accordance with the multi-PUSCH configuration, as described above.

Process 800 may include additional aspects, such as any single aspect or any combination of aspects described below and/or in connection with one or more other processes described elsewhere herein.

In a first aspect, the repetition number is configured via a configuration for a configured grant associated with the single configured grant period.

In a second aspect, alone or in combination with the first aspect, the repetition number is indicated by a TDRA table determined by a TDRA field in DCI signaling to activate a configured grant PUSCH transmission.

In a third aspect, alone or in combination with one or more of the first and second aspects, two or more slots associated with the first transport block and two or more slots associated with the second transport block are determined using the physical slot count or the available slot count.

In a fourth aspect, alone or in combination with one or more of the first through third aspects, the two or more slots associated with the first transport block and the two or more slots associated with the second transport block are associated with a same SLIV.

In a fifth aspect, alone or in combination with one or more of the first through fourth aspects, the second HPID is applied to two or more slots associated with a third transport block based, at least in part, on a collision between one or more repetitions of the second transport block and a semi-static downlink symbol or synchronization signal block.

In a sixth aspect, alone or in combination with one or more of the first through fifth aspects, transmitting the multi-PUSCH communication in accordance with the multi-PUSCH configuration includes transmitting the multi-PUSCH communication based, at least in part, on whether the one or more slots associated with the first transport block or the one or more slots associated with the second transport block have a SLIV that overlaps with one or more downlink symbols configured by RRC signaling.

In a seventh aspect, alone or in combination with one or more of the first through sixth aspects, the one or more RVIDs are each assigned in accordance with a RV sequence.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
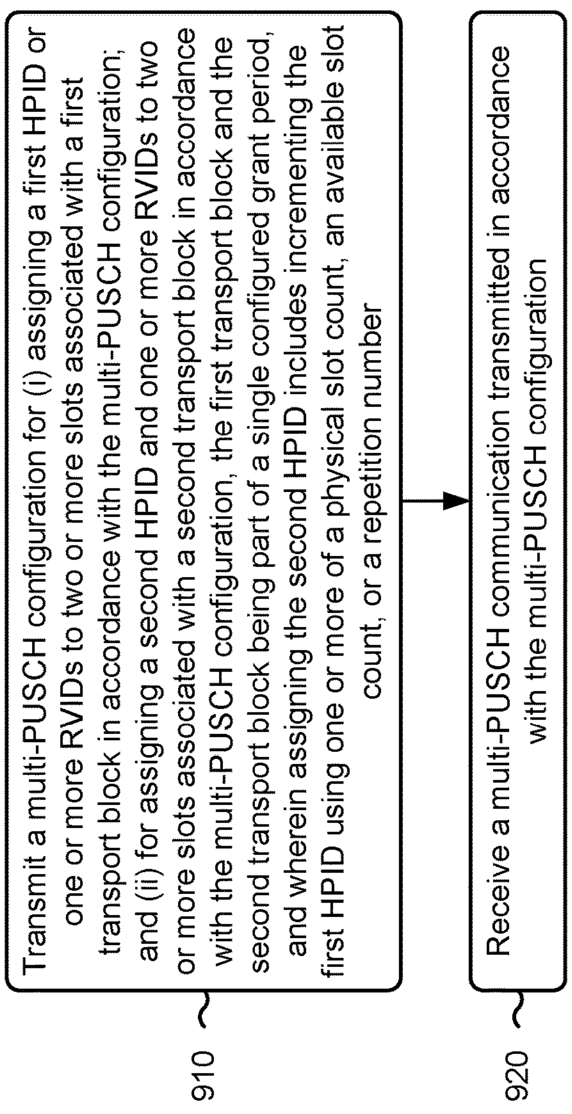
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with a multi-PUSCH configuration with repetition.

As shown in FIG. 9, in some aspects, process 900 may include transmitting a multi-PUSCH configuration for: assigning a first HPID and one or more RVIDs to two or more slots associated with a first transport block in accordance with the multi-PUSCH configuration; and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number (block 910). For example, the network node (e.g., using transmission component 1104 and/or communication manager 1106, depicted in FIG. 11) may transmit a multi-PUSCH configuration for: assigning a first HPID and one or more RVIDs to two or more slots associated with a first transport block in accordance with the multi-PUSCH configuration; and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number, as described above.

As further shown in FIG. 9, in some aspects, process 900 may include receiving a multi-PUSCH communication transmitted in accordance with the multi-PUSCH configuration (block 920). For example, the network node (e.g., using reception component 1102 and/or communication manager 1106, depicted in FIG. 11) may receive a multi-PUSCH communication transmitted in accordance with the multi-PUSCH configuration, as described above.

Process 900 may include additional aspects, such as any single aspect or any combination of aspects described below and/or in connection with one or more other processes described elsewhere herein.

In a first aspect, the repetition number is configured via a configuration for a configured grant associated with the single configured grant period.

In a second aspect, alone or in combination with the first aspect, the repetition number is indicated by a TDRA table determined by a TDRA field in DCI signaling to activate a configured grant PUSCH transmission.

In a third aspect, alone or in combination with one or more of the first and second aspects, two or more slots associated with the first transport block and two or more slots associated with the second transport block are determined using the physical slot count or the available slot count.

In a fourth aspect, alone or in combination with one or more of the first through third aspects, the two or more slots associated with the first transport block and the two or more slots associated with the second transport block are associated with a same SLIV.

In a fifth aspect, alone or in combination with one or more of the first through fourth aspects, the second HPID is applied to two or more slots associated with a third transport block based, at least in part, on a collision between one or more repetitions of the second transport block and a semi-static downlink symbol or synchronization signal block.

In a sixth aspect, alone or in combination with one or more of the first through fifth aspects, transmitting the multi-PUSCH communication in accordance with the multi-PUSCH configuration includes transmitting the multi-PUSCH communication based, at least in part, on whether the one or more slots associated with the first transport block or the one or more slots associated with the second transport block have a SLIV that overlaps with one or more downlink symbols configured by RRC signaling.

In a seventh aspect, alone or in combination with one or more of the first through sixth aspects, the one or more RVIDs are each assigned in accordance with a RV sequence.

In an eighth aspect, alone or in combination with one or more of the first through seventh aspects, the RV sequence is applied based, at least in part, on the physical slot count or the available slot count.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
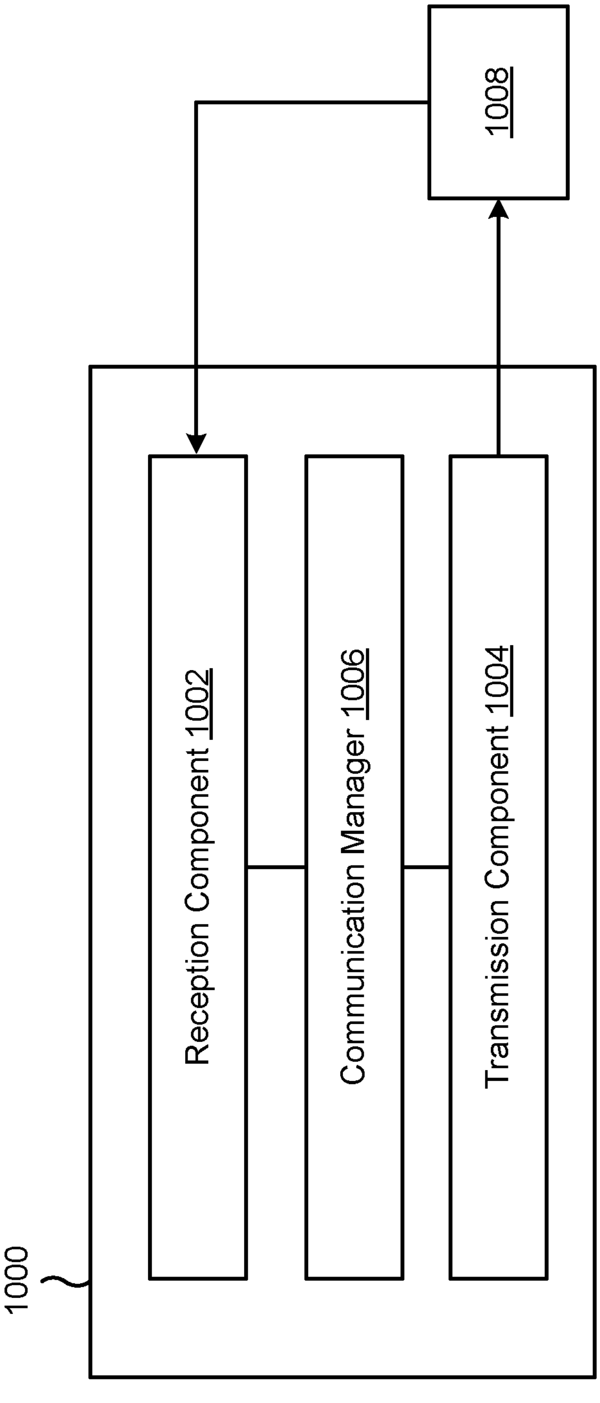
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a multi-PUSCH configuration. The communication manager 1006 may assign a first HPID and one or more RVIDs to two or more slots associated with a first transport block in accordance with the multi-PUSCH configuration. The communication manager 1006 may assign a second HPID and the one or more RVIDs to two or more slots associated with a second transport block in accordance with the multi-PUSCH configuration. The first transport block and the second transport block may be part of a single configured grant period. Assigning the second HPID includes incrementing the first HPID using one or more of a physical slot count, an available slot count, or a repetition number. The transmission component 1004 may transmit a multi-PUSCH communication in accordance with the multi-PUSCH configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
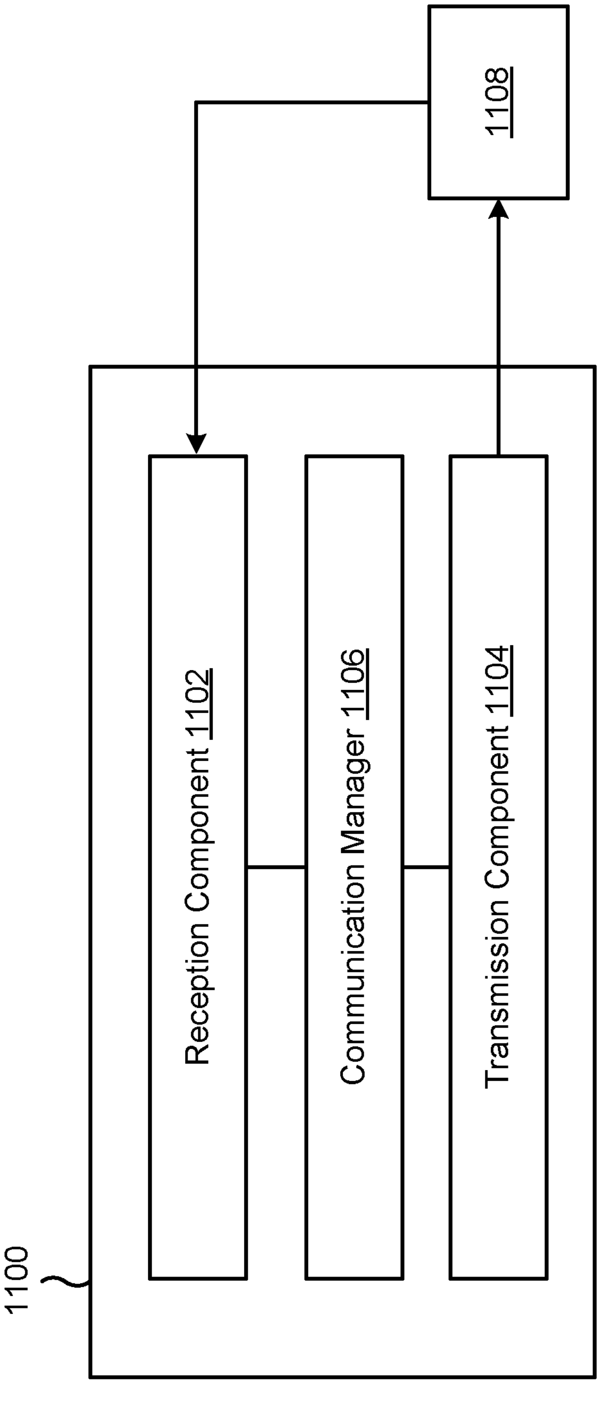
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit a multi-PUSCH configuration for assigning a first HPID and one or more RVIDs to two or more slots associated with a first transport block in accordance with the multi-PUSCH configuration, and assigning a second HPID and the one or more RVIDs to two or more slots associated with a second transport block in accordance with the multi-PUSCH configuration. The first transport block and the second transport block may be part of a single configured grant period. Assigning the second HPID may include incrementing the first HPID using one or more of a physical slot count, an available slot count, or a repetition number. The reception component 1102 may receive a multi-PUSCH communication transmitted in accordance with the multi-PUSCH configuration.

The transmission component 1104 may transmit a multi-PUSCH configuration for assigning one or more of a first HPID and one or more RVIDs to two or more slots in a first transport block, and for assigning one or more of a second HPID and the one or more RVIDs to two or more slots in a second transport block, the first transport block and the second transport block being part of a single configured grant period and the second HPID being incremented relative to the first HPID using one or more of a physical slot count, an available slot count, or a repetition number. The reception component 1102 may receive a multi-PUSCH communication in accordance with the multi-PUSCH configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment, comprising: receiving a multi-PUSCH configuration; assigning a first HPID and one or more RVIDs to two or more slots associated with a first transport block in accordance with the multi-PUSCH configuration; assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmitting a multi-PUSCH communication in accordance with the multi-PUSCH configuration.

Aspect 2: The method of Aspect 1, wherein the repetition number is configured via a configuration for a configured grant associated with the single configured grant period.

Aspect 3: The method of any of Aspects 1-2, wherein the repetition number is indicated by a TDRA table determined by a TDRA field in DCI signaling to activate a configured grant PUSCH transmission.

Aspect 4: The method of any of Aspects 1-3, wherein two or more slots associated with the first transport block and two or more slots associated with the second transport block are determined using the physical slot count or the available slot count.

Aspect 5: The method of any of Aspects 1-4, wherein the two or more slots associated with the first transport block and the two or more slots associated with the second transport block are associated with a same SLIV.

Aspect 6: The method of any of Aspects 1-5, wherein the second HPID is applied to two or more slots associated with a third transport block based, at least in part, on a collision between one or more repetitions of the second transport block and a semi-static downlink symbol or synchronization signal block.

Aspect 7: The method of any of Aspects 1-6, wherein transmitting the multi-PUSCH communication in accordance with the multi-PUSCH configuration includes transmitting the multi-PUSCH communication based, at least in part, on whether the one or more slots associated with the first transport block or the one or more slots associated with the second transport block have a SLIV that overlaps with one or more downlink symbols configured by RRC signaling.

Aspect 8: The method of any of Aspects 1-7, wherein the one or more RVIDs are each assigned in accordance with a RV sequence.

Aspect 9: The method of Aspect 8, wherein the RV sequence is applied based, at least in part, on the physical slot count or the available slot count.

Aspect 10: A method of wireless communication performed by a network node, comprising: transmitting a multi-PUSCH configuration for: assigning a first HPID and one or more RVIDs to two or more slots associated with a first transport block in accordance with the multi-PUSCH configuration; and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receiving a multi-PUSCH communication transmitted in accordance with the multi-PUSCH configuration.

Aspect 11: The method of Aspect 10, wherein the repetition number is configured via a configuration for a configured grant associated with the single configured grant period.

Aspect 12: The method of any of Aspects 10-11, wherein the repetition number is indicated by a TDRA table determined by a TDRA field in DCI signaling to activate a configured grant PUSCH transmission.

Aspect 13: The method of any of Aspects 10-12, wherein two or more slots associated with the first transport block and two or more slots associated with the second transport block are determined using the physical slot count or the available slot count.

Aspect 14: The method of any of Aspects 10-13, wherein the two or more slots associated with the first transport block and the two or more slots associated with the second transport block are associated with a same SLIV.

Aspect 15: The method of any of Aspects 10-14, wherein the second HPID is applied to two or more slots associated with a third transport block based, at least in part, on a collision between one or more repetitions of the second transport block and a semi-static downlink symbol or synchronization signal block.

Aspect 16: The method of any of Aspects 10-15, wherein transmitting the multi-PUSCH communication in accordance with the multi-PUSCH configuration includes transmitting the multi-PUSCH communication based, at least in part, on whether the one or more slots associated with the first transport block or the one or more slots associated with the second transport block have a SLIV that overlaps with one or more downlink symbols configured by RRC signaling.

Aspect 17: The method of any of Aspects 10-16, wherein the one or more RVIDs are each assigned in accordance with a RV sequence.

Aspect 18: The method of Aspect 17, wherein the RV sequence is applied based, at least in part, on the physical slot count or the available slot count.

Aspect 19: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-18.

Aspect 20: An apparatus for wireless communication at a device, the apparatus comprising one or more memories and one or more processors coupled to the one or more memories, the one or more processors configured to cause the device to perform the method of one or more of Aspects 1-18.

Aspect 21: An apparatus for wireless communication, the apparatus comprising at least one means for performing the method of one or more of Aspects 1-18.

Aspect 22: A non-transitory computer-readable medium storing code for wireless communication, the code comprising instructions executable by one or more processors to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

Aspect 24: A device for wireless communication, the device comprising a processing system that includes one or more processors and one or more memories coupled with the one or more processors, the processing system configured to cause the device to perform the method of one or more of Aspects 1-18.

Aspect 25: An apparatus for wireless communication at a device, the apparatus comprising one or more memories and one or more processors coupled to the one or more memories, the one or more processors individually or collectively configured to cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to cause the UE to:

receive a multiple physical uplink shared channel (multi-PUSCH) configuration;

assign a first hybrid automatic repeat request (HARQ) process identifier (HPID) and one or more redundant version identifiers (RVIDs) to two or more slots associated with a first transport block in accordance with the multi-PUSCH configuration;

assign a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmit a multi-PUSCH communication in accordance with the multi-PUSCH configuration.

2. The UE of claim 1, wherein the repetition number is configured via a configuration for a configured grant associated with the single configured grant period.

3. The UE of claim 1, wherein the repetition number is indicated by a time domain resource allocation (TDRA) table determined by a TDRA field in downlink control information (DCI) signaling to activate a configured grant PUSCH transmission.

4. The UE of claim 1, wherein the two or more slots associated with the first transport block and the two or more slots associated with the second transport block are determined using the physical slot count or the available slot count.

5. The UE of claim 1, wherein the two or more slots associated with the first transport block and the two or more slots associated with the second transport block are associated with a same start length indicator value (SLIV).

6. The UE of claim 1, wherein the second HPID is applied to two or more slots associated with a third transport block based, at least in part, on a collision between one or more repetitions of the second transport block and a semi-static downlink symbol or synchronization signal block.

7. The UE of claim 1, wherein the one or more processors, to cause the UE to transmit the multi-PUSCH communication in accordance with the multi-PUSCH configuration, are configured to cause the UE to transmit the multi-PUSCH communication based, at least in part, on whether the one or more slots associated with the first transport block or the one or more slots associated with the second transport block have a start length indicator value (SLIV) that overlaps with one or more downlink symbols configured by radio resource control (RRC) signaling.

8. The UE of claim 1, wherein the one or more RVIDs are each assigned in accordance with a redundant version (RV) sequence.

9. The UE of claim 8, wherein the RV sequence is applied based, at least in part, on the physical slot count or the available slot count.

10. A network node for wireless communication, comprising:

one or more memories; and one or more processors, coupled to the one or more memories, configured to cause the network node to:

transmit a multiple physical uplink shared channel (multi-PUSCH) configuration for:

assigning one or more of a first hybrid automatic repeat request (HARQ) process identifier (HPID) and one or more redundant version identifiers (RVIDs) to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receive a multi-PUSCH communication transmitted in accordance with the multi-PUSCH configuration.

11. The network node of claim 10, wherein the repetition number is configured via a configuration for a configured grant associated with the single configured grant period.

12. The network node of claim 10, wherein the repetition number is indicated by a time domain resource allocation (TDRA) table determined by a TDRA field in downlink control information (DCI) signaling to activate a configured grant PUSCH transmission.

13. The network node of claim 10, wherein the two or more slots associated with the first transport block and the two or more slots associated with the second transport block are determined using the physical slot count or the available slot count.

14. The network node of claim 10, wherein the two or more slots associated with the first transport block and the two or more slots associated with the second transport block are associated with a same start length indicator value (SLIV).

15. The network node of claim 10, wherein the second HPID is applied to two or more slots of a third transport block based, at least in part, on a collision between one or more repetitions of the second transport block and a semi-static downlink symbol or synchronization signal block.

16. The network node of claim 10, wherein the one or more processors, to cause the network node to receive the multi-PUSCH communication in accordance with the multi-PUSCH configuration, are configured to cause the network node to receive the multi-PUSCH communication based, at least in part, on whether the one or more slots associated with the first transport block or the one or more slots associated with the second transport block have a start length indicator value (SLIV) that overlaps with one or more downlink symbols configured by radio resource control (RRC) signaling.

17. The network node of claim 10, wherein the one or more RVIDs are assigned in accordance with a redundant version (RV) sequence.

18. The network node of claim 17, wherein the RV sequence is applied based, at least in part, on the physical slot count or the available slot count.

19. A method of wireless communication performed by a user equipment (UE), comprising:

receiving a multiple physical uplink shared channel (multi-PUSCH) configuration;

assigning a first hybrid automatic repeat request (HARQ) process identifier (HPID) and one or more redundant version identifiers (RVIDs) to two or more slots associated with a first transport block in accordance with the multi-PUSCH configuration;

assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and transmitting a multi-PUSCH communication in accordance with the multi-PUSCH configuration.

20. The method of claim 19, wherein the repetition number is configured via a configuration for a configured grant associated with the single configured grant period.

21. The method of claim 19, wherein the repetition number is indicated by a time domain resource allocation (TDRA) table determined by a TDRA field in downlink control information (DCI) signaling to activate a configured grant PUSCH transmission.

22. The method of claim 19, wherein the two or more slots associated with the first transport block and the two or more slots associated with the second transport block are determined using the physical slot count or the available slot count.

23. The method of claim 19, wherein the two or more slots associated with the first transport block and the two or more slots associated with the second transport block are associated with a same start length indicator value (SLIV).

24. The method of claim 19, wherein the second HPID is applied to two or more slots associated with a third transport block based, at least in part, on a collision between one or more repetitions of the second transport block and a semi-static downlink symbol or synchronization signal block.

25. The method of claim 19, wherein transmitting the multi-PUSCH communication in accordance with the multi-PUSCH configuration includes transmitting the multi-PUSCH communication based, at least in part, on whether the one or more slots associated with the first transport block or the one or more slots associated with the second transport block have a start length indicator value (SLIV) that overlaps with one or more downlink symbols configured by radio resource control (RRC) signaling.

26. The method of claim 19, wherein the one or more RVIDs are each assigned in accordance with a redundant version (RV) sequence.

27. The method of claim 26, wherein the RV sequence is applied based, at least in part, on the physical slot count or the available slot count.

28. A method of wireless communication performed by a network node, comprising:

transmitting a multiple physical uplink shared channel (multi-PUSCH) configuration for:

assigning a first hybrid automatic repeat request (HARQ) process identifier (HPID) and one or more redundant version identifiers (RVIDs) to two or more slots associated with a first transport block in accordance with the multi-PUSCH configuration, and assigning a second HPID and the one or more RVIDs to two or more slots associated with a second transport block in accordance with the multi-PUSCH configuration, the first transport block and the second transport block being part of a single configured grant period, and wherein assigning the second HPID includes incrementing the first HPID using one or more of a physical slot count, an available slot count, or a repetition number; and receiving a multi-PUSCH communication transmitted in accordance with the multi-PUSCH configuration.

29. The method of claim 28, wherein the repetition number is configured via a configuration for a configured grant associated with the single configured grant period.

30. The method of claim 28, wherein the two or more slots associated with the first transport block and the two or more slots associated with the second transport block are determined using the physical slot count or the available slot count.

* * * * *